United States Patent
Kam

(10) Patent No.: US 8,193,450 B1
(45) Date of Patent: Jun. 5, 2012

(54) WIRE BRIDGE FOR HIGH DENSITY POWER DISTRIBUTION

(75) Inventor: Pascal Kam, Union City, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/247,976

(22) Filed: Sep. 28, 2011

(51) Int. Cl.
*H02G 3/04* (2006.01)
*H05K 7/20* (2006.01)

(52) U.S. Cl. ......... 174/95; 174/15.6; 174/16.3; 361/704

(58) Field of Classification Search ............... 361/704, 361/707; 174/15.6, 16.3, 95–97
See application file for complete search history.

(56) References Cited

U.S. PATENT DOCUMENTS

| | | | | |
|---|---|---|---|---|
| 6,268,566 B1 * | 7/2001 | Takiguchi et al. | ........ | 174/72 A |
| 6,452,812 B1 * | 9/2002 | Saito et al. | ........ | 361/818 |
| 6,528,728 B1 * | 3/2003 | Shima | ........ | 174/101 |
| 6,706,969 B1 * | 3/2004 | Young | ........ | 174/95 |
| 7,332,672 B2 * | 2/2008 | Henry | ........ | 174/68.1 |
| 7,608,782 B2 * | 10/2009 | Hill | ........ | 174/84 C |
| 7,635,812 B2 * | 12/2009 | Cardi | ........ | 174/72 A |
| 7,939,759 B2 * | 5/2011 | Henry | ........ | 174/68.1 |
| 8,058,555 B2 * | 11/2011 | Cardi | ........ | 174/72 A |
| 2010/0258685 A1 * | 10/2010 | Gardner et al. | ........ | 248/68.1 |

\* cited by examiner

*Primary Examiner* — Robert J Hoffberg
(74) *Attorney, Agent, or Firm* — Turocy & Watson, LLP

(57) ABSTRACT

The disclosed subject matter comprises a wire bridge that can dissipate heat from power wires of an electrically powered system to facilitate improving the lifetime of wires, reducing interference between wires, and reduce negative impaction of the electrically powered system. The wire bridge can be formed of a thermally conductive material to facilitate dissipating heat from associated wires, and can include a base component and a bridge component that is raised up from the base component wherein a subset of wires can be placed across and in contact with the bridge component. Optionally another subset of wires can be placed in an open gap created between the base component and bridge component; channels can be formed in the wire bridge wherein wires can be inserted; multiple bridge levels can be formed; or fasteners can be employed to fasten wires to the wire bridge.

18 Claims, 12 Drawing Sheets

WIRE BRIDGE FOR HIGH DENSITY POWER DISTRIBUTION

TECHNICAL FIELD

The subject disclosure relates to power distribution, and more specifically, to a wire bridge for high density power distribution.

BACKGROUND

An electrically powered system, such as, for example, a larger electronic system or electro-mechanical system, can employ one or more power distribution units (PDUs) to provide power to various components of the electrically powered system. Typically, a plurality of power wires can be routed from a PDU to the various components of the electrically powered system, wherein the plurality of power wires transfer (e.g., supply) power from the PDU to the various components of the electrically powered system.

One issue with the electrically powered systems is that power wires can generate a significant and undesirable amount of heat resulting from significant amounts of power being transferred via the power wire. The heat from a power wire can negatively impact itself and/or other wires (e.g., adjacent wires), including other power wires, communication wires (e.g., wires that transmit communication signals), etc. For example, wire insulation of another wire can be compromised (e.g., melted away) or the other wire can otherwise be negatively impacted resulting in the other wire having a shortened lifetime, and/or other problems (e.g., power shorts or disruptions, or communication disruptions) can occur due to the negative impact caused by the heat generated by respective power wires.

The above-described deficiencies of today's devices and systems are merely intended to provide an overview of some of the problems of conventional devices and systems, and are not intended to be exhaustive. Other problems with the state of the art and corresponding benefits of some of the various non-limiting implementations may become further apparent upon review of the following detailed description.

SUMMARY

The following presents a simplified summary in order to provide a basic understanding of some aspects of this disclosure. This summary is not an extensive overview, and it is not intended to identify key/critical elements of this disclosure or to delineate any scope. The sole purpose of this summary is to present some concepts in a simplified form as a prelude to the more detailed description that is presented later.

In accordance with various aspects, the disclosed subject matter can comprise a wire bridge comprising a base component configured to include a first base portion and a second base portion at respective sides of the wire bridge, wherein the first base portion and the second base portion have a substantially rectangular shape and a defined size, and are usable for placement on a surface associated with an electrically powered system to facilitate stability of the wire bridge. The wire bridge also can include a bridge component configured to contain a bridge portion of a specified size and shape, a first wall portion of a specified height and having a respective substantially rectangular shape and a respective size, and a second wall portion of the specified height and having the respective substantially rectangular shape and the respective size, wherein a first end of the bridge portion is connected to a top end of the first wall portion, and a second end of the bridge portion is connected to a top end of the second wall portion, wherein the first wall portion and the second wall portion are configured to be substantially perpendicular to the bridge portion and the base component, and wherein at least a top surface of the bridge portion is configured to be usable to have a subset of wires placed thereon to facilitate dissipation of heat from the subset of wires.

To the accomplishment of the foregoing and related ends, certain illustrative aspects of the disclosed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
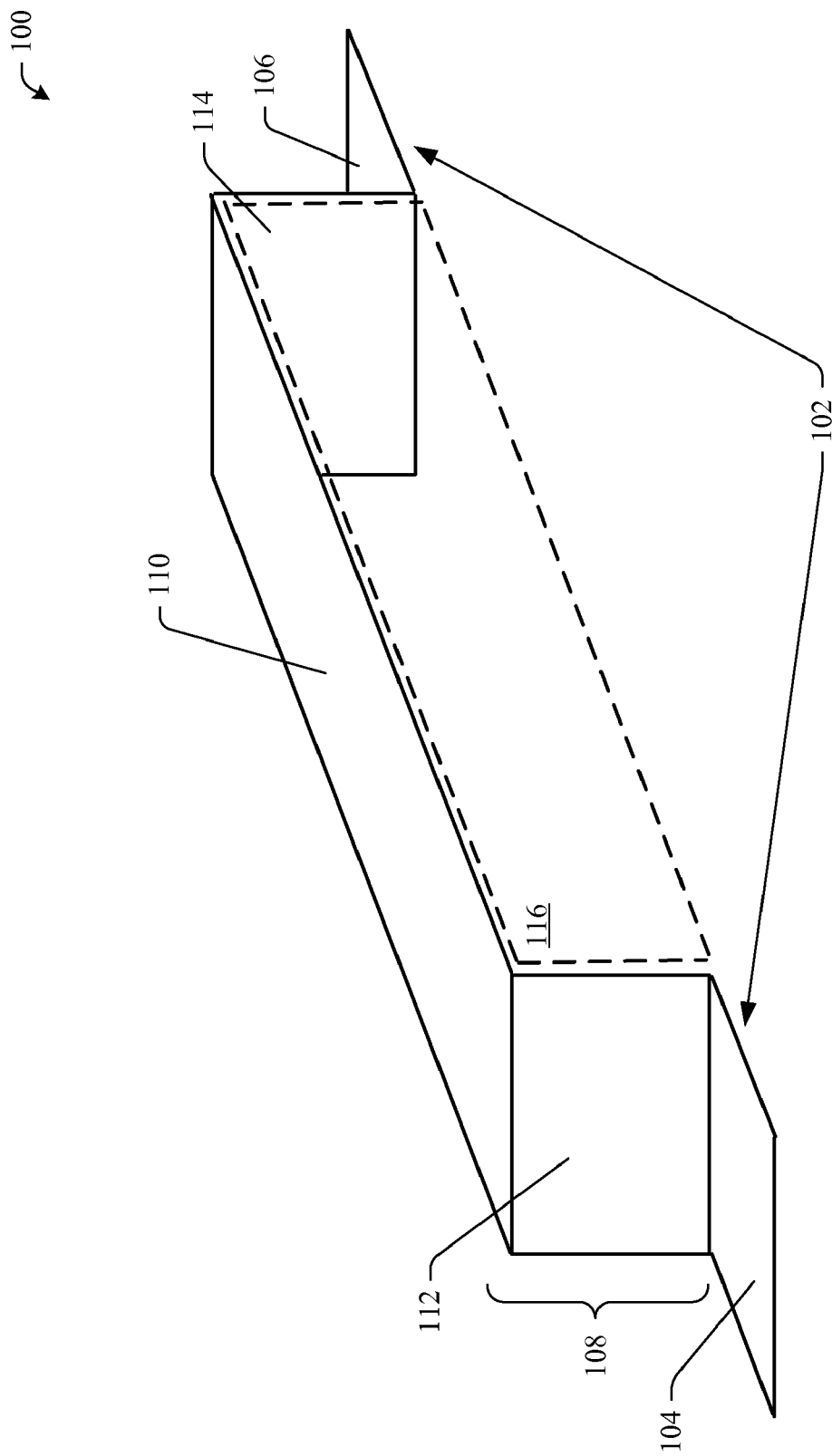
FIG. 1 illustrates a diagram of an example wire bridge that can facilitate controlling (e.g., reducing) the amount of heat in wires associated with an electrically powered system, in accordance with various aspects and implementations.

This disclosure is now described with reference to the drawings, wherein like reference numerals are used to refer to like elements throughout. In the following description, for purposes of explanation, numerous specific details are set forth in order to provide a thorough understanding thereof. It may be evident, however, that this disclosure can be practiced without these specific details. In other instances, well-known structures and devices are shown in block diagram form in order to facilitate a description thereof.

An electrically powered system, such as, for example, a larger electronic system or electro-mechanical system, can employ one or more power distribution units (PDUs) (e.g., alternating current PDUs (ACPDUs)) to provide power to various components of the electrically powered system. An electrically powered system can include a number of power wires for use to transfer power between a PDU and various components that need power to function in the electrically powered system. Due in part to the transfer of power via the power wires, the power wires can generate a significant and undesirable amount of heat, which can cause a power wire to negatively impact another wire (e.g., another power wire or other type of wire) in relatively close proximity to that power wire when the heat emanated from the power wire is applied to the other wire due in part to the close proximity of the power wire to the other wire.

The disclosed subject matter comprises a wire bridge that can dissipate heat from power wires of an electrically powered system to facilitate improving the lifetime of wires (e.g., power wires, communication wires, etc.), reducing interference between wires (e.g., between adjacent wires by inserting adjacent wires in separate channels), and reducing other negative impaction (e.g., power or communication disruption) of the electrically powered system. The wire bridge can be formed of a desired thermally conductive material (e.g., aluminum or copper alloy or other desired metal material) to facilitate dissipating heat from wires (e.g., wires, including power wires, in relatively close proximity to each other), for example, in contact with the wire bridge. In an aspect, the wires bridge can include a base component that is attachable to a desired surface (e.g., bottom floor, wall, system component, etc.) of the electrically powered system, and a bridge component that can be raised up from the base component. During use, a subset of wires (e.g., power wires) can be placed across and in contact with the bridge component. Heat generated by respective wires can be transferable to the wire bridge, as the wire bridge can have thermal capacity to absorb heat from the respective wires. The wire bridge can dissipate or radiate heat to the air to facilitate cooling of the wire bridge and maintaining available thermal capacity to continue to absorb heat from the wires.

As used in this application, in certain instances, the terms "component," "system," "device", and the like, can refer to a mechanical or physical entity. Various aspects or features will be presented in terms of systems that may include a number of devices, components, and the like. It is to be understood and appreciated that the various systems may include additional devices, components, etc. and/or may not include all of the devices, components, etc., discussed in connection with the figures. A combination of these approaches also can be used.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the terms "set" or "subset" as employed herein exclude the empty set, e.g., a set with no elements therein. Thus, a "set" or a "subset" in the subject disclosure includes one or more elements or entities. As an illustration, a set of channels includes one or more channels; a subset of wires includes one or more wires; etc. Likewise, the term "group" as utilized herein refers to a collection of one or more entities; e.g., a group of wires refers to one or more wires.

FIG. 1 illustrates a diagram of an example wire bridge 100 that can facilitate controlling (e.g., reducing) the amount of heat in wires associated with an electrically powered system, in accordance with various aspects and implementations. In an aspect, the wire bridge 100 can comprise a base component 102 that can be employed to have one or more base portions, such as first base portion 104 (e.g., base pad) and second base portion 106, that can be used to form a base of the wire bridge 100. For example, the first base portion 104 can be on one side of the wire bridge 100 and a second base portion 106 can be located on the opposite side of the wire bridge 100. The first base portion 104 and second base portion 106 each can be sized and shaped, as desired. For instance, a base portion (e.g., 104, 106) can be polygonal (e.g., rectangular) in shape or substantially polygonal. It is to be appreciated and understood that, in different implementations, the base component 102 can comprise a different number of base portions wherein the different base portions can be located in various desired locations, for example, depending in part on where the wire bridge is to be located in relation to the structure in which the wire bridge is contained and/or the wires. In an aspect, the base portions 104 and 106 can be secured to (e.g., fastened using screws, pins, clips, adhesives, wire wraps, tie wraps, clamps etc.), or placed on, a surface (e.g., bottom floor or surface of a power supply unit (PSU) cabinet, wall of the cabinet etc.) of the electrically powered system. Securing the wire bridge 100 to a surface provides for the mechanical stability of the wire bridge 100 and the wires supported by it 100.

In an aspect, the base portions 104 and 106 can be located on each side of a bridge component 108 wherein the bridge component 108 can comprise a top surface or bridge portion 110 that is raised to a specific height above the base component 102 and a set of wall portions, including first wall portion 112 and second wall portion 114, that can extend from the base component 102 upward to a specified height corresponding to the height of the bridge portion 110, the ends of which are attached to the respective top ends of the first wall portion 112 and second wall portion 114. In an implementation, a wall portion (e.g., 112, 114) can be perpendicular, or at least substantially perpendicular, to an associated base portion (e.g., 104, 106) and the associated bridge portion 110. The wall portions 112 and 114, and the bridge portion 110, can be of a desired material having a desired thickness (e.g., material having a desired level of rigidity and mechanical strength) to enable the wall portions 112 and 114 to provide adequate support to maintain the bridge portion 110 at the desired height and to facilitate enabling the bridge portion 110 to accommodate the weight of wires placed on the top surface of the bridge portion 110.

In accordance with various aspects and implementations, the bridge component 108 and/or the base component 102 can be formed of a desired material(s), such as, for example, a thermally conductive material (e.g., aluminum alloy, aluminum, copper alloy, copper, sheet metal, iron alloy (e.g., steel), iron, gold alloy, gold, silver alloy, silver, or other desired thermally conductive metals or metal alloys), wherein the thermally conductive material can facilitate dissipating heat from the subset of wires when the subset of wires is placed in contact with the bridge component 108. It is to be appreciated and understood that, in accordance with another implementation, portion(s) of the base component 102 or bridge component 108 also can be formed (e.g., partially) of another material (e.g., a non-thermally conductive material, such as plastic), which can be usable, for example, to facilitate maintaining separation of the wires, facilitating attachment of the wire bridge 100 to the surface (e.g., plastic clip or screws can be part of or associated with the wire bridge 100 to facilitate attaching the wire bridge 100 to the surface), or facilitate providing mechanical stability for the wire bridge 100.

In an implementation, the base component 102 and bridge component 108 can be formed (e.g., fabricated, constructed) using a single piece of thermally conductive material that can be shaped to form the base component 102 and bridge component 108 such that the bridge component 108 has a bridge portion 110 that is raised above the base component 102 and supported by the set of wall portions (e.g., 112, 114), wherein there can be an open region 116 (e.g., gap, hole) that is defined and surrounded by the bottom side of the bridge portion 110, the set of wall portions (e.g., 112, 114), and the surface with which the wire bridge 100 is associated. In some implementations, the wire bridge 100 has in part a U-shaped cross section. The wire bridge 100 can be formed or fabricated from a suitable thermally conductive material via a punch press process, a metal molding process (e.g., metal injection molding process), or other desired wire bridge formation process.

In an example, one or more components 104, 106, 110, 112 or 114 can have hard edges. In another example, the one or more components 104, 106, 110, 112 or 114 can have rounded or chamfered edges. In an example, the wire bridge 100 can be built as a single, integrated component, for example, by using a metal molding process or by using sheet metal and a stamping press. In another example, the wire bridge 100 can be built to include separate components 104, 106, 110, 112 and 114 that can be combined together into a wire bridge by the end user. The flat pieces 104, 106, 110, 112 and 114 allow for convenient kit packaging and shipping. In an example, the components 104, 106, 110, 112 and 114 can be configured to be snap-fitted with each other by the end user to form the wire bridge 100. In other examples, the end user can use screws, adhesives or other fasteners to assemble the wire bridge 100 from the components 104, 106, 110, 112 and 114. In an example, the walls 112 and 114 can contain notches at various levels for receiving the bridge portion 110, such that the end user can select the level of the bridge portion 110 in relation to the walls 112 and 114. In an example, the walls 112 and 114 can contain rails such that the bridge portion can slide along the rails, to allow the end user to adjust the level of the bridge portion 110 in relation to the walls 112 and 114.

The wire bridge 100 can be employed to control the amount of heat in a set or subset of wires (e.g., wires, including power wires, situated in relatively close proximity to each other) (not shown in FIG. 1). The wires can include a set or subset of power wires associated with a power supply (e.g., PDU, such as an ACPDU). The wire bridge is placed in contact with the wires to facilitate reducing or removing the heat generated by the wires. In various implementations, the wire bridge can be used for providing thermal stability for virtually any number of wires and types of wires, improving the useful life of wires, reducing interference between wires (e.g., between adjacent wires or wires situated in relatively close proximity to each other), and/or reducing other negative impaction (e.g., power or communication disruption) of the electrically powered system. For instance, the wire bridge 100 can act as a heat sink to transfer (e.g., via conduction or absorption) heat generated by the subset of wires from the subset of wires to the wire bridge 100.

The subset of wires, which can be power wires that transfer power to various components of the electrically powered system, can generate a substantial amount of heat due in part to the amount of current being transferred via respective wires of the subset of wires. In higher powered applications, the heat generated by one power wire can negatively and significantly impact the power wire itself and/or another wire(s) (e.g., another power wire, or another type of wire, such as a data communication wire) that is in relatively close proximity or contact with the power wire, as more fully disclosed herein. In accordance with various aspects of the disclosed subject matter, the subset of wires can be placed in contact with the bridge component 108 (e.g., the top surface of the bridge portion 110). All or at least a significant portion of the heat generated by the subset of wires can be transferred (e.g., via conduction or thermal radiation) from the respective wires in the subset to the bridge component 108 of the wire bridge 100 to reduce the heat level of the respective wires. In another aspect, the wire bridge 100 can dissipate or expel the heat from the wire bridge 100 (e.g., via convection or thermal radiation of the heat and/or as facilitated by fan cooling) to facilitate cooling of the wire bridge 100, so that the wire bridge 100 can have available thermal capacity for further and/or continued absorption of heat from the respective wires with transference of that heat to the wire bridge 100.

In accordance with an implementation, if desired or necessary, another subset of wires optionally can be placed in the open region 116. The other subset of wires can comprise a power wire(s) or another type(s) of wire(s), such as, for example, a data communication wire, which typically generates relatively little heat and thus heat dissipation from such other wire is not necessary. That is, the wire bridge 100 can be usable to organize the wires, including respective wires of the subset of wires and respective wires of the other subset of wires, based at least in part on the size and/or type of wire of the respective wires in each of the subsets.

Figure 2:
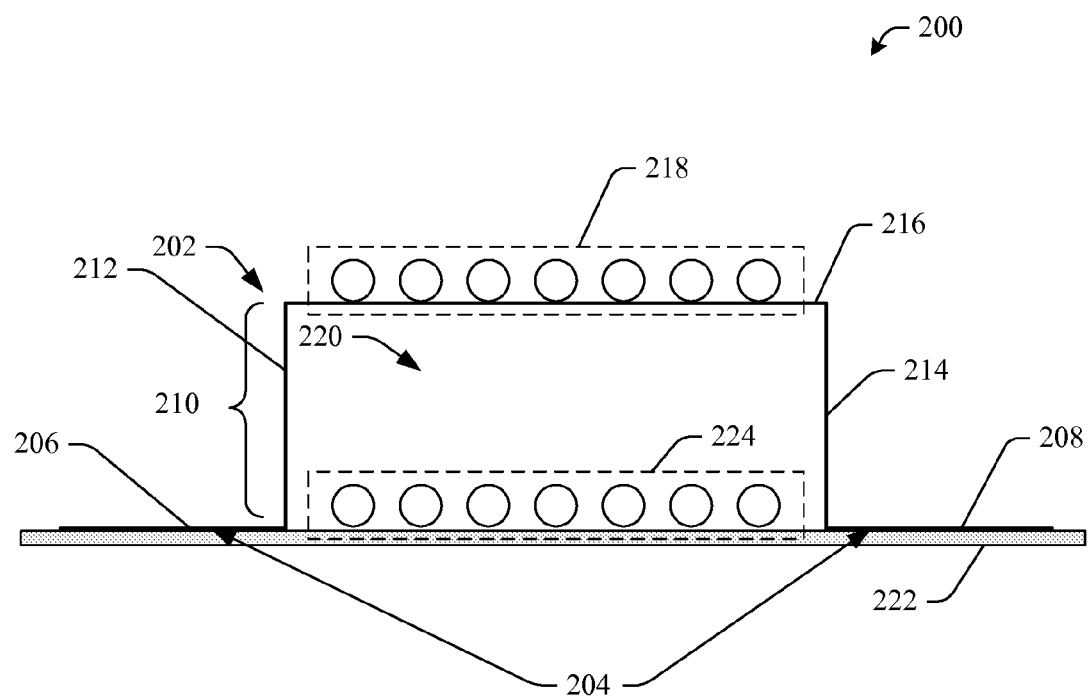
FIG. 2 depicts a diagram of a front view of an example system that can employ a wire bridge that can facilitate controlling the amount of heat in wires associated with an electrically powered system, in accordance with various aspects and implementations.

FIG. 2 depicts a diagram of a front view of an example system 200 that can employ a wire bridge that can facilitate controlling the amount of heat in wires associated with an electrically powered system, in accordance with various aspects and implementations. In an aspect, the system 200 can comprise a wire bridge 202 that can include a base component 204 that can comprise a first base portion 206 (e.g., first base pad) and a second base portion 208 that can be on opposite sides of the wire bridge 202.

In another aspect, the wire bridge 202 also can comprise a bridge component 210 that can comprise a first wall portion 212 and a second wall portion 214 that can be associated with respective ends of the first base portion 206 and second base portion 208, as shown in FIG. 2.

In still another aspect, the bridge component 210 can include a bridge portion 216 that can comprise the top surface of the bridge component 210 on which a first subset of wires 218 (e.g., power wires) can be placed, wherein the bridge component 210 can dissipate heat from such wires 218, as more fully disclosed herein. Respective ends of the bridge portion 216 can be associated with (e.g., connected to) respective top ends of the first wall portion 212 and second wall portion 214, wherein the first wall portion 212 and second wall portion 214 can provide support to the bridge portion 216 as well as facilitate dissipation of heat from the first subset of wires 218 (depicted as a cross-section in FIG. 2). As shown in FIG. 2, the first wall portion 212 and second wall portion 214 can extend upward from respective ends of the first base portion 206 and second base portion 208, to the respective ends of the bridge portion 216. In accordance with various aspects or implementations, the respective wires of the first subset of wires 218 can be retained and maintained in desired contact with the surface of the bridge component 210 using a desired retaining feature, such as an adhesive (e.g., thermal adhesive or grease), tape (e.g., thermal tape), or a fastener(s) (e.g., plastic clip or tie, or a clip or tie that is formed of a thermally conductive material), such as more fully disclosed herein, to facilitate thermal and/or mechanical stability of the first subset of wires 218.

In another aspect, a open region 220 (e.g., gap portion) can be formed as a result of the shape of the wire bridge 202, wherein the open region 220 can be a space defined and surrounded by the inside surfaces of the first wall portion 212 and second wall portion 214, the bottom surface of the bridge portion 216, and a surface 222 that can face opposite to the bottom surface of the bridge portion 216. In accordance with various aspects and implementations, the size, shape, and thickness of the wire bridge 202, and respective components and portions thereof, can be virtually any suitable size, shape and thickness, wherein the size, shape and thickness of the wire bridge 202 can be based at least in part on predefined wire-bridge-formation criteria, as disclosed herein.

In accordance with still another aspect, as desired, a second subset of wires 224 (depicted as a cross-section in FIG. 2) can be routed through the open region 220. The second subset of wires 224 can comprise power wires or other wires (e.g., communication wires), and the boundaries of open region 220, as provided by the wire bridge 202 and surface 222 on which the wire bridge 202 is placed or attached, can facilitate retaining the second subset of wires 224 within the open region 220 to facilitate mechanical and/or thermal stability of the second subset of wires 224. In accordance with various aspects or implementations, the respective wires of the second subset of wires 224 can be retained in relation to each other (e.g., maintained a suitable distance from each other, or maintained together in a bundle, or maintained against a surface of the wire bridge 202 or the surface with which the wire bridge 202 is associated) using a desired retaining feature, such as an adhesive, a tape, or a fastener(s), such as more fully disclosed herein, to facilitate thermal and/or mechanical stability of the second subset of wires 224.

Figure 3:
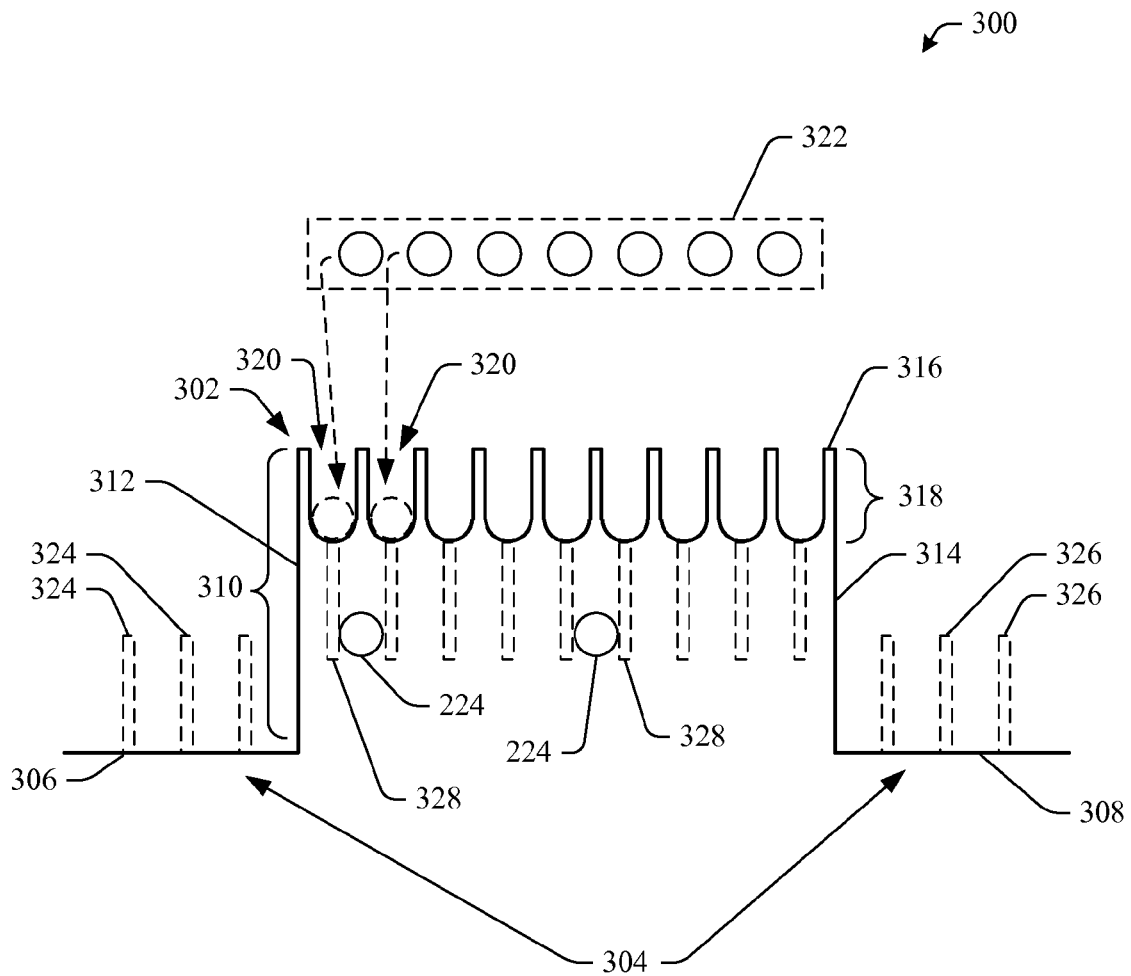
FIG. 3 presents a diagram of a front view of an example system that can employ a wire bridge comprising a plurality of channels to facilitate controlling (e.g., reducing) the amount of heat in wires associated with an electrically powered system, in accordance with various aspects and implementations.

FIG. 3 presents a diagram of a front view of an example system 300 that can employ a wire bridge comprising a plurality of channels to facilitate controlling (e.g., reducing) the amount of heat in wires associated with an electrically powered system, in accordance with various aspects and implementations. In an aspect, the system 300 can comprise a wire bridge 302 can comprise a base component 304 that can comprise a first base portion 306 (e.g., first base pad) and a second base portion 308 that can be on opposite sides of the wire bridge 302. In another aspect, the wire bridge 302 also can comprise a bridge component 310 that can comprise a first wall portion 312 and a second wall portion 314 that respectively can be associated with, and extend upward from, respective ends of the first base portion 306 and second base portion 308, as shown in FIG. 3. The bridge component 310 also can contain a bridge portion 316, wherein respective ends of the bridge portion 316 can be associated with respective top ends of the first wall portion 312 and second wall portion 314. All or at least a portion of the wire bridge 302 can be formed of a thermally conductive material, as more fully disclosed herein.

In accordance with various aspects and implementations, the bridge component 310 can comprise, or can have formed thereon, a channel component 318 comprising a plurality of channels 320, wherein respective wires 322 of a subset of wires (depicted as a cross-section in FIG. 3) can be inserted into respective channels 320 of the plurality of channels. Insertion of the respective wires 322 of the subset of wires into respective channels 320 of the plurality of channels can facilitate improved mechanical stability of the wires 322 and separation of a wire 322 from adjacent wires, as the wires 322 can be retained in the their respective channels 320 (e.g., the respective channels 320 can restrict or inhibit lateral movement of the respective wires 322). The plurality of channels 320 also can facilitate improved thermal stability of the wires 322 via improved absorption of heat from the subset of wires 322, as the respective wires 322 can be in contact with the respective channels, which can be formed of a thermally conductive material to facilitate transference of heat from the wires 322 to the channels 320. The thermally conductive material of the channel component 318 can be the same material as, or a different material than, that of other portions of the wire bridge 302.

In an aspect, the height of the walls of the respective channels 320 can be as high (e.g., long) as desired, wherein a larger height, such that the channel walls span beyond the wire 322 within the channel 320, typically can provide improved (e.g., increased) heat absorption than channel walls with a relatively shorter height (e.g., channel walls that have a height comparable to the diameter of the wire 322 therein), as the longer channel walls can act as heat sink fins that can enable heat to dissipate from the heat sink fins (e.g., via thermal conduction and/or radiation).

In another aspect, the respective channels 320 of the plurality of channels can be uniformly sized and/or shaped, or can be differently sized and/or shaped, based at least in part on the respective sizes and/or shapes of the wires 322 and/or the predefined wire-bridge-formation criteria. For example, as desired, the plurality of channels 320 can be customized such that, if each wire 322 of the subset of wires has a round shape of a specified size (e.g., diameter), the respective channels 320 of subset of channels can be shaped with a rounded (e.g., semi-circle) well bottom (as shown in FIG. 3) to accommodate the round shape of the wires 322 and the width of the respective channels 320 can be wide enough to enable the respective wires 322 to be inserted into the respective channels 320. Also, as desired, if a certain wire 322 has a different size or shape than another wire 322, the channels 320 for those respective wires 322 can be customized to correspond to the respective sizes and/or shapes of those wires. Shaping and sizing a channel 320 to correspond to the shape and size of a wire 322 to optimize (e.g., maximize) the amount of contact between the wire 322 and walls of the channel 320 when the wire 322 is inserted into the channel 320 can result in increased dissipation of heat from the wire 322 as compared to a channel that is shaped and sized such that there are air gaps between the wire and channel (e.g., channel walls and/or channel well bottom) (e.g., a square-shaped channel well bottom that results in air gaps when a round-shaped wire is inserted into the channel). In an implementation, the diameter of the channel well bottom is slightly less than the diameter of the wire, such that the wire can be snug fitted or snapped into well bottom. Thermal adhesive or grease also can be employed to facilitate optimizing contact with the wire 322, as the thermal adhesive or grease can fill in any air gaps as well as facilitate maintaining optimal thermal contact between the wire 322 and channel 320.

In accordance with various implementations, the wire bridge 302 can employ additional heat sink fins on the wall portions (e.g., 312, 314), the base portions (e.g., 306, 308) and/or the bottom surface of the wire bridge portion 316, wherein the heat sink fins can be utilized to facilitate further dissipation of heat from the wire bridge 302 to allow for further thermal capacity of the wire bridge 302 thereby enabling the wire bridge 302 to absorb additional heat from the subset of wires 322. For instance, optionally (e.g., as illustrated by the dotted lines in FIG. 3) the wire bridge 302 can comprise a first subset of heat sink fins 324 located on the base portions (e.g., 306, 308), a second subset of heat sink fins 326 located on the wall portions (e.g., 312, 314), or third subset of heat sink fins 328 located on the bottom surface of the bridge portion 316. In an aspect, a subset of heat sink fins (e.g., 324, 326, 328) also can be channels that can be utilized to contain wires 322 and function in a same or similar manner as the plurality of channels 320, wherein, for example, at least a portion of the channels formed by adjacent heat sink fins can be sized and/or shaped to correspond with the plurality of channels 320 and/or the wires 322 to be inserted therein, in accordance with the predefined wire-bridge-formation criteria.

Figure 4:
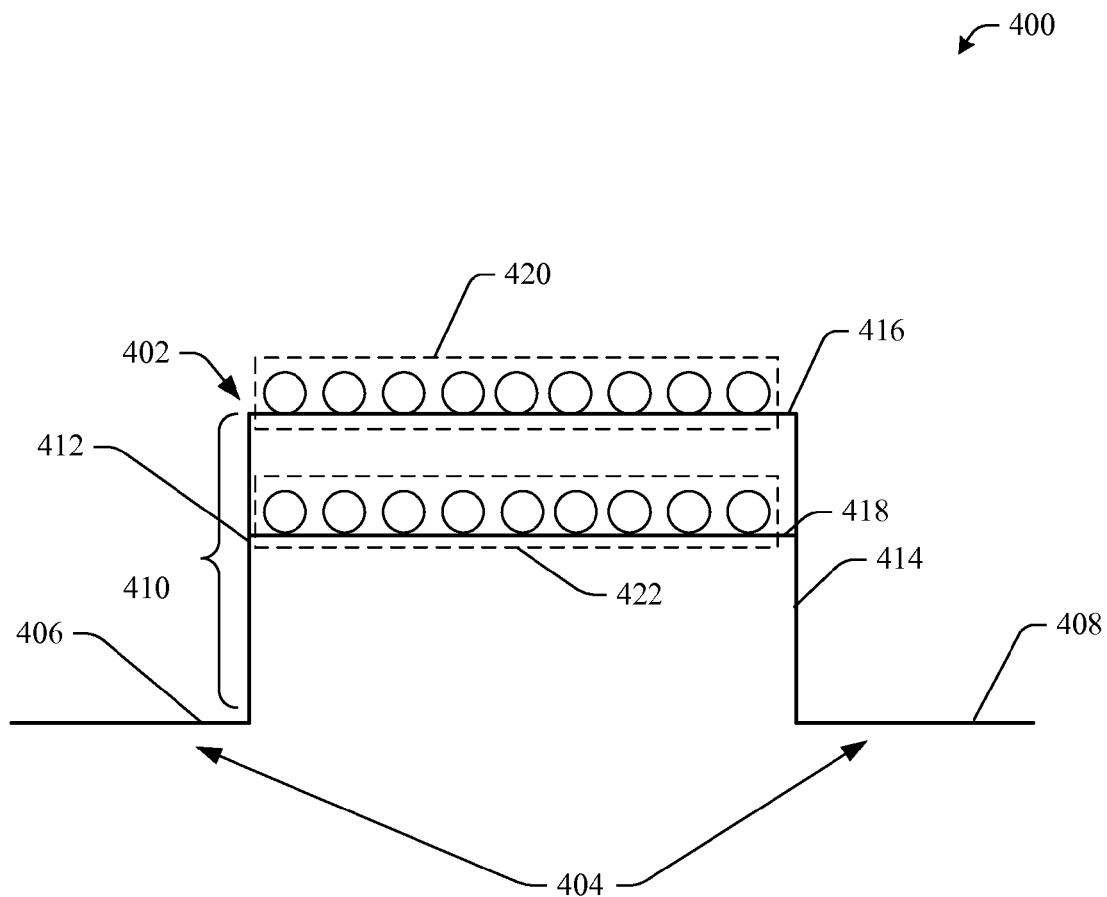
FIG. 4 depicts a diagram of a front view of another example system that can employ a multi-level wire bridge to facilitate controlling the amount of heat in wires associated with an electrically powered system, in accordance with various aspects and implementations.

FIG. 4 depicts a diagram of a front view of another example system 400 that can employ a multi-level wire bridge to facilitate controlling the amount of heat in wires associated with an electrically powered system, in accordance with various aspects and implementations. In an aspect, the system 400 can comprise a wire bridge 402 that can comprise a base component 404 that can comprise a first base portion 406 and a second base portion 408 that can be on opposite sides of the wire bridge 402. In another aspect, the wire bridge 402 also can comprise a bridge component 410 that can comprise a first wall portion 412 and a second wall portion 414 that respectively can be associated with, and extend upward from, respective ends of the first base portion 406 and second base portion 408, as shown in FIG. 4. All or at least a portion of the wire bridge 402 can be formed of a thermally conductive material, as more fully disclosed herein.

In accordance with an implementation, the bridge component 410 also can include a first bridge portion 416, wherein respective ends of the first bridge portion 416 can be associated with respective top ends of the first wall portion 412 and second wall portion 414. In an aspect, the bridge component 410 can comprise at least a second bridge portion 418 that can be formed below the first bridge portion 416 and associated with (e.g., connected to) the first wall portion 412 and second wall portion 414. It is to be appreciated and understood that the wire bridge 402 can comprise virtually any desired number (e.g., integer number) of bridge portions or bridge levels.

In an aspect, a first subset of wires 420 (depicted as a cross-section in FIG. 4) can be placed on the top surface of the first bridge portion 416, and a second subset of wires 422 (depicted as a cross-section in FIG. 4) can be place on the top surface of the second bridge portion 418. The first bridge portion 416 can be employed to facilitate absorbing or dissipating heat from the first subset of wires 420, and the second bridge portion 418 can be employed to facilitate absorbing or dissipating heat from the second subset of wires 422, as more fully disclosed herein. As desired, a third subset of wires (not shown in FIG. 4) can be placed on the surface on which the wire bridge 402 is associated (e.g., surface on which the wire bridge 402 is placed or to which the wire bridge 402 is attached).

Figure 5:
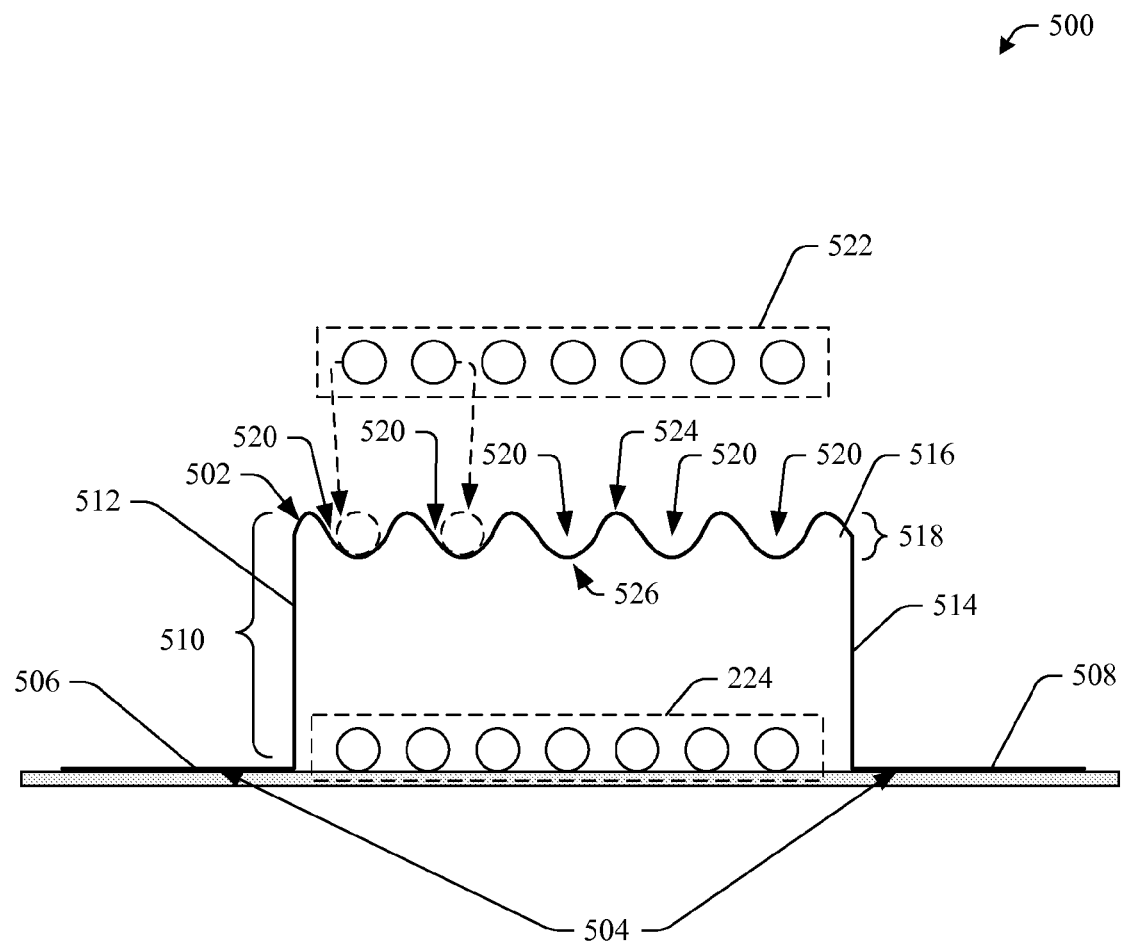
FIG. 5 illustrates a diagram of a front view of an example system that can employ a plurality of channels to facilitate providing mechanical and thermal stability to wires and controlling the amount of heat in the wires associated with an electrically powered system, in accordance with various aspects and implementations.

FIG. 5 illustrates a diagram of a front view of an example system 500 that can employ a plurality of channels to facilitate providing mechanical and thermal stability to wires and controlling the amount of heat in the wires associated with an electrically powered system, in accordance with various aspects and implementations. In an aspect, the system 500 can comprise a wire bridge 502 that can comprise a base component 504 that can comprise a first base portion 506 and a second base portion 508 that can be on opposite sides of the wire bridge 502. In another aspect, the wire bridge 502 also can comprise a bridge component 510 that can comprise a first wall portion 512 and a second wall portion 514 that respectively can be associated with, and extend upward from, respective ends of the first base portion 506 and second base portion 508, as depicted in FIG. 5. In yet another aspect, the bridge component 510 also can contain a bridge portion 516, wherein respective ends of the bridge portion 516 can be associated with respective top ends of the first wall portion 512 and second wall portion 514. In accordance with still another aspect, all or at least a portion of the wire bridge 502 can be formed of a thermally conductive material, as more fully disclosed herein.

In accordance with various aspects and implementations, the bridge component 510 can comprise, or can have formed thereon, a channel component 518 comprising a plurality of channels 520, wherein respective wires 522 of a subset of wires (depicted as a cross-section in FIG. 5) can be inserted into respective channels 520 of the plurality of channels. In an aspect, the respective channels 520 of the channel component 518 can be shaped, for instance, in the form of a wave pattern of alternating peaks 524 and troughs 526 that form the respective channels 520 as the channel component 518 spans across the bridge portion 516 from the first wall portion 512 to the second wall portion 514. The wire bridge 502 and/or the plurality of channels 520 can be formed via a desired fabrication process, such as, for example a material-molding process (e.g., metal-injection-molding process) or a punch-press process, to shape the wire bridge 502 and/or the plurality of channels 520, as desired.

Insertion of the respective wires 522 of the subset of wires into respective channels 520 of the plurality of channels can facilitate improved mechanical stability of the wires 522 and separation of a wire 522 from adjacent wires, as the wires 522 can be retained in the their respective channels 520. The plurality of channels 520 also can facilitate improved thermal stability of the wires 522 via improved absorption of heat from the subset of wires 522, as the respective wires 522 can be in contact with the respective channels, which can be formed of a thermally conductive material to facilitate transference of heat from the wires 522 to the channels 520. The thermally conductive material of the channel component 518 can be the same material as, or a different material than, that of other portions of the wire bridge 502.

Figure 6:
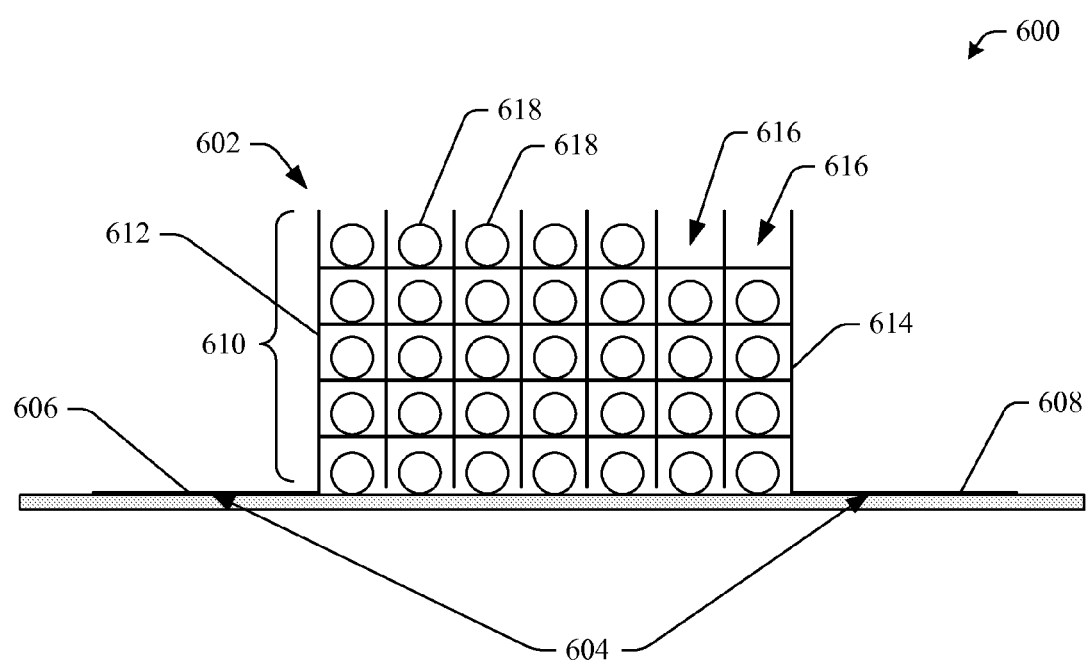
FIG. 6 illustrates a diagram of a front view of an example system that can employ a multi-compartment wire bridge to facilitate controlling the amount of heat in wires associated with an electrically powered system, in accordance with various aspects and implementations.

FIG. 6 illustrates a diagram of a front view of an example system 600 that can employ a multi-compartment wire bridge to facilitate controlling the amount of heat in wires associated with an electrically powered system, in accordance with various aspects and implementations. In an aspect, the system 600 can comprise a wire bridge 602 that can comprise a base component 604 that can comprise a first base portion 606 and a second base portion 608 that can be on opposite sides of the wire bridge 602. In another aspect, the wire bridge 602 also can comprise a bridge component 610 that can comprise a first wall portion 612 and a second wall portion 614 that respectively can be associated with, and extend upward from, respective ends of the first base portion 606 and second base portion 608, as depicted in FIG. 6.

In yet another aspect, the bridge component 610 also can contain a bridge portion comprising a plurality of compartments 616. In one aspect, a portion of the plurality of compartments 616 can be compartments or channels formed on a top surface of the bridge component 610 and can be open ended, wherein respective wires 618 of a subset of wires 618 (depicted as a cross-section in FIG. 6) can be placed in the compartments 616 via the respective open ends of the compartments 616. In another aspect, another portion of the plurality of compartments 616 can be in another level of the wire bridge 602 below the top level (e.g., top surface) of the wire bridge 602. Another portion of the subset of wires 618 can be inserted into the respective compartments 616 of the other portion of the plurality of compartments 616 in this middle level. In still another aspect, the still another portion of the plurality of compartments 616 can be at a lowest level of the wire bridge 602 (e.g., below the middle level), wherein such portion of the plurality of compartments 616 can have a bottom border that is the surface (not shown in FIG. 6) on which the wire bridge 602 is placed or attached. Still another subset of wires 618 can be inserted into or routed via this lowest level of compartments 616. In accordance with an aspect, all or at least a portion of the wire bridge 602, including the bridge portion comprising the plurality of compartments 616, can be formed of a thermally conductive material, as more fully disclosed herein. Due to the thermal conductive properties of the bridge portion, the bridge portion can absorb or dissipate heat from the respective wires 618 of the subset of wires 618. In another aspect, insertion of the respective wires 618 of the subset of wires 618 into respective compartments 616 of the plurality of compartments 616 can facilitate improved mechanical stability of the wires 618 and separation of a wire 618 from adjacent wires, as the wires 618 can be retained in the their respective compartments 616.

It is to be appreciated and understood that, while the compartments 616 are depicted as being substantially rectangular or square in shape, this disclosure is not so limited. In accordance with an implementation, the plurality of compartments 616 can be formed to have a shape(s) and size(s) that conforms, or at least substantially conforms to the shape(s) and size(s) of the subset of wires (e.g., compartment shaped round to conform to a round-shaped wire). In an aspect, the plurality of compartments 616 can be uniformly shaped and sized, or respectively (e.g., differently) shaped and sized, depending in part on the respective shapes and sizes of the wires 618 and/or the predefined wire-bridge-formation criteria.

Figure 7:
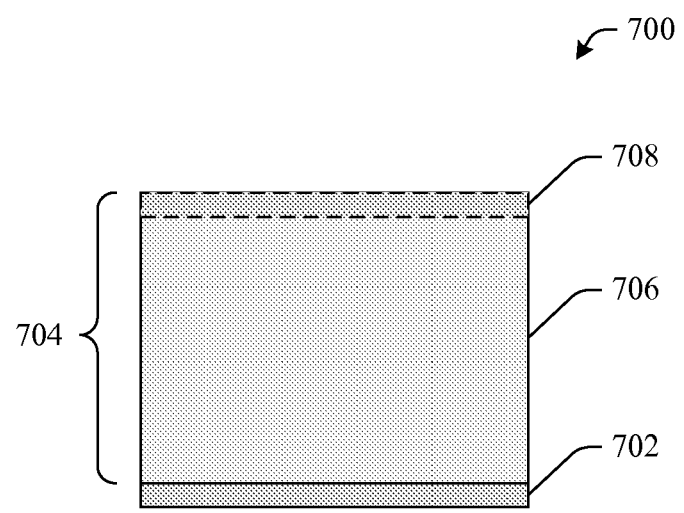
FIG. 7 presents a diagram of a side view of an example wire bridge in accordance with an implementation.

FIG. 7 presents a diagram of a side view of an example wire bridge 700 in accordance with an implementation. In an aspect, the wire bridge 700 can include a base component 702 that can be located at the base of the wire bridge 700, and can be placed on or attached to a surface (not shown in FIG. 7), such as a surface associated with an electrically powered system. In another aspect, the wire bridge 700 also can contain a bridge component 704 that can include a wall portion 706, which can be located on one side of the wire bridge 700, where the bridge component 704 also can include a second wall portion (not shown in FIG. 7) that can be located on the other side of the wire bridge 700 and separated by the bridge portion 708. The bridge component 704 can include the bridge portion 708, which can be associated with the top end of the wall portion 706 (and the top end of the second wall portion), and the base component 702 can be associated with the bottom end of the wall portion 706. In another aspect, all or at least a portion of the wire bridge 700 can be formed of a thermally conductive material, as more fully disclosed herein.

In still another aspect, as depicted in this side view of the wire bridge 700, the shape of the bridge portion 708 can be flat or substantially flat as the bridge portion 708 spans across the wire bridge 700 from left to right. A subset of wires (not shown in FIG. 7) can be placed on the bridge portion 708, wherein the thermally conductive material of the bridge portion, along with the bridge portion 708 being raised above the base component 702 to allow air to circulate under the bridge portion, can facilitate absorption or dissipation of heat from the subset of wires on the bridge portion 708.

Figure 8:
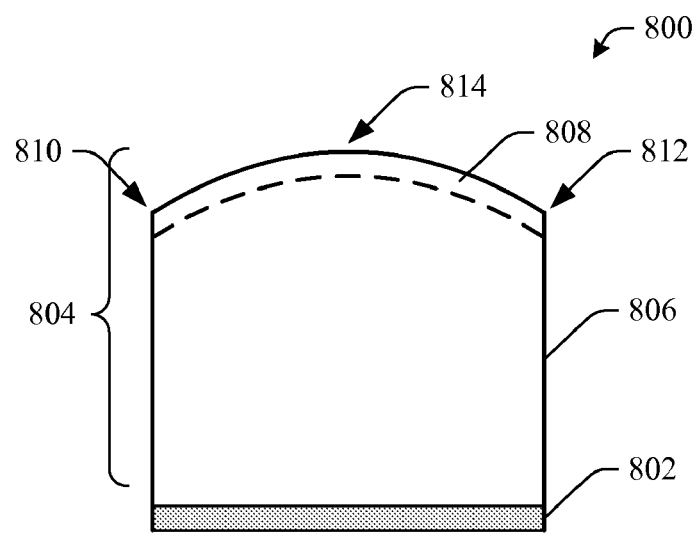
FIG. 8 illustrates a diagram of a side view of an example wire bridge in accordance with another implementation.

FIG. 8 illustrates a diagram of a side view of an example wire bridge 800 in accordance with another implementation. In an aspect, the wire bridge 800 can include a base component 802 that can be located at the base of the wire bridge 800, and can be placed on or attached to a surface (not shown in FIG. 8), such as a surface associated with an electrically powered system. In another aspect, the wire bridge 800 also can contain a bridge component 804 that can include a wall portion 806, which can be located on one side of the wire bridge 800, where the bridge component 804 also can include a second wall portion (not shown in FIG. 8) that can be located on the other side of the wire bridge 800 and separated by the bridge portion 808. The bridge component 804 can include the bridge portion 808, which can be associated with the top end of the wall portion 806 (and the top end of the second wall portion), and the base component 802 can be associated with the bottom end of the wall portion 806. In another aspect, all or at least a portion of the wire bridge 800 can be formed of a thermally conductive material, as more fully disclosed herein.

In still another aspect, as depicted in this side view of the wire bridge 800, the shape of the bridge portion 808 can be curved in shape as the bridge portion 808 spans across the wire bridge 800 from left to right. For instance, the bridge portion 808 can be at a lower (e.g., lowest) height at the front end 810 and/or back end 812 of the bridge portion 808. The front end 810 corresponds to an edge of the wall 806 at one and of the bridge portion 808 and the back end 812 corresponds to the other edge of the wall 806 at the other end of the bridge portion 808. The bridge portion 808 can increase in height from the lower point at the front end 810 until the bridge portion 808 reaches its highest height at a specified point (e.g., middle point) 814 in between the front end 810 and back end 812. The bridge portion 808 can decrease in height as the bridge portion 808 proceeds from the specified point 814 to the back end 812 of the bridge portion 808. A subset of wires (not shown in FIG. 8) can be placed on the bridge portion 808, wherein the thermally conductive material of the bridge portion, along with the bridge portion 808 being raised above the base component 802 to allow air to circulate under the bridge portion, can facilitate absorption or dissipation of heat from the subset of wires on the bridge portion 808. In another aspect, the curved shape of the bridge portion 808 can facilitate maintaining the subset of wires in contact with the bridge portion 808 (e.g., as compared to a bridge portion having a flat surface), as the wires can conform to the curved shape of the bridge portion 808 as the wires are being raised off of the surface to be placed across the bridge portion 808 at the front end 810 and as the wires are proceeding downward from the back end 812 of the bridge portion 808 to the surface. The surface is in contact with the base component 802. In an aspect, the radius of curvature of the bridge portion 808 is selected based on the application and the wire sizes involved to provide for maximum contact between the wires and the bridge portion 808 and to provide for optimum mechanical support for the wires. In an aspect, the radius of curvature of the bridge portion 808 is selected to be sufficiently large (e.g. sufficiently flat) such that there is not an undesirable amount of tension in the wires caused by the gravitation pull at the two ends 810 and 812 of the bride portion 808.

Figure 9:
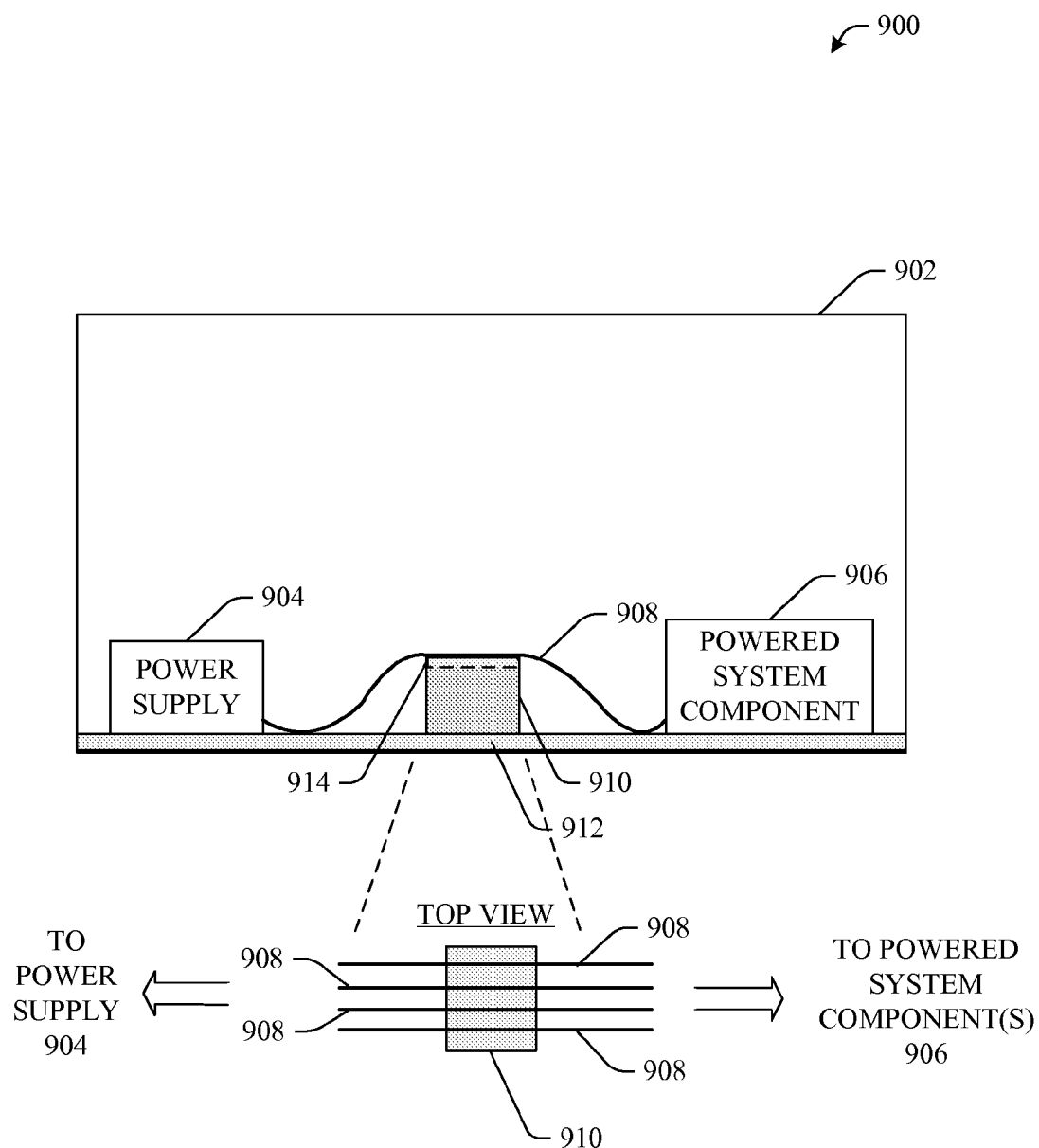
FIG. 9 depicts a diagram of an example system that can employ a wire bridge in an electrically powered system to facilitate controlling the amount of heat in the wires associated with an electrically powered system, in accordance with various aspects and implementations.

FIG. 9 depicts a diagram of an example system 900 that can employ a wire bridge in an electrically powered system to facilitate controlling the amount of heat in the wires associated with an electrically powered system, in accordance with various aspects and implementations. In an aspect, the system 900 can include a cabinet 902 that can have a specified size (e.g., cubic size) and shape, wherein the cabinet 902 can be employed as part of an electrically powered system. The cabinet 902 can be formed of one or more materials (e.g., wood, metal, plastic, etc.) that can facilitate providing mechanical stability to the cabinet 902.

In another aspect, one or more power supplies, including power supply 904 (e.g., PDU, such as an ACPDU), can be placed within the cabinet 902 or can be associated with the cabinet 902 (e.g., can be placed outside of, but can be connected to the cabinet 902, or a component therein). The power supply 904 can be electrically connected to, and can provide power (e.g., alternating current (AC), direct current (DC)) to, one or more powered system components, including powered system component 906, to facilitate enabling the powered system components, in accordance with their respective functions and features, to operate in the electrically powered system. To facilitate supplying power from the power supply 904 to the powered system components (e.g., 906), a subset of wires 908 can electrically connect the power supply 904 to the powered system components.

In still another aspect, the cabinet 902 also can contain one or more wire bridges, including a wire bridge 910 to facilitate absorbing or dissipating heat from wires, such as the subset of wires 908, associated with the electrically powered system, as more fully disclosed herein. The wire bridge 910 can be placed on or attached to a surface 912 of the cabinet 902 in a location between the power supply 904 and the powered system component 906. In yet another aspect, the subset of wires 908 can be placed across the top surface of the bridge portion 914 of the wire bridge 910. The subset of wires 908 can generate a significant amount of heat as the wires 908 transfer power from the power supply 904 to the powered system components (e.g., 906). The wire bridge 910, including the bridge portion 914, can absorb or dissipate all or at least a portion of that heat from the wires 908, as more fully disclosed herein. The heat absorbed by the wire bridge 910 can be dissipated or radiated from the wire bridge 910, for instance, into the air surrounding the wire bridge 910. In various implementations, the wire bridge 910 can also be in physical contact with water or a liquid coolant, such that the heat absorbed by the wire bridge 910 can be dissipated into the water or the coolant. For example, a pipe or tube carrying water or coolant can be inserted in the cavity formed by the cabinet surface 912 and the bottom surface of the bridge portion 914. As a result, the wire bridge 910 can maintain at least some thermal capacity to continue absorbing heat from the subset of wires 908.

In accordance with various aspects and implementations, the size, shape, and thickness of a wire bridge, and respective components and portions thereof, can be virtually any suitable size, shape and thickness, wherein the size, shape and thickness of the wire bridge can be based at least in part on predefined wire-bridge-formation criteria. The predefined wire-bridge-formation criteria can comprise, for example, the number of wires to be placed on the top surface of the bridge component and/or channel component; the number of wires to be routed through the open portion (e.g., open region, gap) or desired size of the open portion; the respective thicknesses of respective wires; the respective weights of respective wires; the uniformity, or lack of uniformity, of the respective wires with regard to size, shape and thickness; the type of material(s) being used to form the wire bridge; whether there are channels formed on the wire bridge; whether there are fins on the wire bridge; thickness of the channel walls or fins; the height of the channel walls in relation to the size or thickness (e.g., diameter) of the wires; the height of the fins; whether thermally conductive tape, grease or adhesive is being used; whether thermally conductive clips or ties are being used; the surface color or finish of the wire bridge (e.g., typically matte finish or darker color surfaces can absorb and radiate more heat than shiny or lighter color surfaces); the thermal conductivity of the materials being used for the wire bridge; whether a (another) heat sink is associated with the wire bridge; expected amount of air flow (e.g., air flow rate) across the wire bridge; whether fan cooling will also be employed to facilitate cooling the wires; expected ambient temperature in the area wherein the wire bridge is to be employed; available space within the unit or cabinet wherein the wire bridge is to be employed; and/or other factors or wire-bridge-formation criteria.

In one implementation, the wires 908 can include several twelve gauge wires. In one implementation, the wires 908 can include several cables of very large diameters, for examples, 2-0 cables. In one implementation, the wires 908 can include wires of various sizes ranging from one gauge wires to twenty gauge wires.

In accordance with various aspects, in addition to, or as an alternative to, a bridge component having a subset of channels, fasteners (e.g., thermal or non-thermal transferring ties, clips, etc.) or tape (e.g., thermal adhesive tape or other type of adhesive tape) can be employed to fasten or retain the respective wires to a wire bridge. In another aspect, thermally conductive grease or adhesive can be used to retain the subset of wires on a bridge portion of the bridge component and/or within respective channels of a channel component. The thermal tape, thermal grease or adhesive, or thermal transferring ties or clips can facilitate removal or reduction of heat from the subset of wires via the inherent thermal conductive properties of these components and/or due to these components assisting in maintaining a desirable level of contact between the wires and the bridge portion of the wire bridge.

In accordance with yet other implementations, a wire bridge optionally can include a fin component (not shown) that can comprise a subset of fins formed of a suitable material, such as a thermally conductive material, wherein the subset of fins can be placed at desired locations (e.g., top surface of the bridge portion of the bridge component, bottom surface of the bridge portion, wall portions of the bridge component, top surface of the base portions of the base component) and can be employed to facilitate further dissipation of heat from the wire bridge (e.g., after the wire bridge has transferred heat from the subset of wires to the wire bridge). The subset of fins can be formed or fabricated out of the same material as the bridge component or can be a different material. For example, the subset of fins can be formed along with the bridge component and base component via a suitable fabrication process (e.g., punch press, metal injection molding process, etc.). In an aspect, a subset of channels of the channel component also can comprise fins; that is, the walls on each side of a channel can be fins. In accordance with still other implementations, a separate heat sink (not shown) can be connected to the wire bridge to facilitate further dissipating of heat from the subset of wires associated with the wire bridge.

In accordance with still other implementations, a wire guide (not shown) can be formed on or attached to the wire bridge to facilitate identifying respective wires placed on the wire bridge. The wire guide can comprise respective pieces of descriptive information, respectively associated with respective wires, to provide a user (e.g., system technician or other system user) information that identifies what type of wire the wire is, the powered system component or power supply with which the wire is associated, what wire is supposed to be inserted in a channel or compartment of the wire bridge, etc. The descriptive information can be textual information using alphanumeric characters, color coding where respective colors are indicative of respective wires, or other desired information.

The aforementioned systems and/or devices have been described with respect to interaction between several components. It should be appreciated that such systems, devices, and components can include those components or sub-components specified therein, some of the specified components or sub-components, and/or additional components. Sub-components also could be implemented as components coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Figure 10:
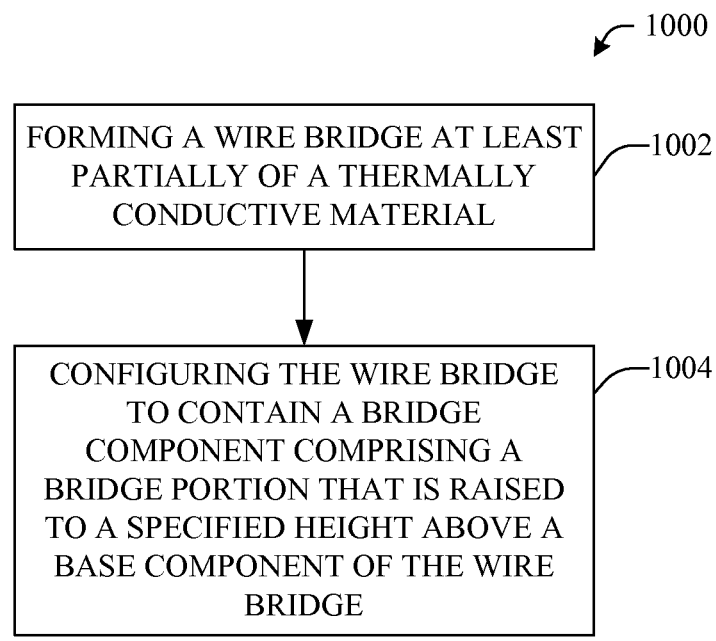
FIG. 10 illustrates a flow diagram of an example method for forming a wire bridge in accordance with various aspects and implementations of the disclosed subject matter.
Figure 11:
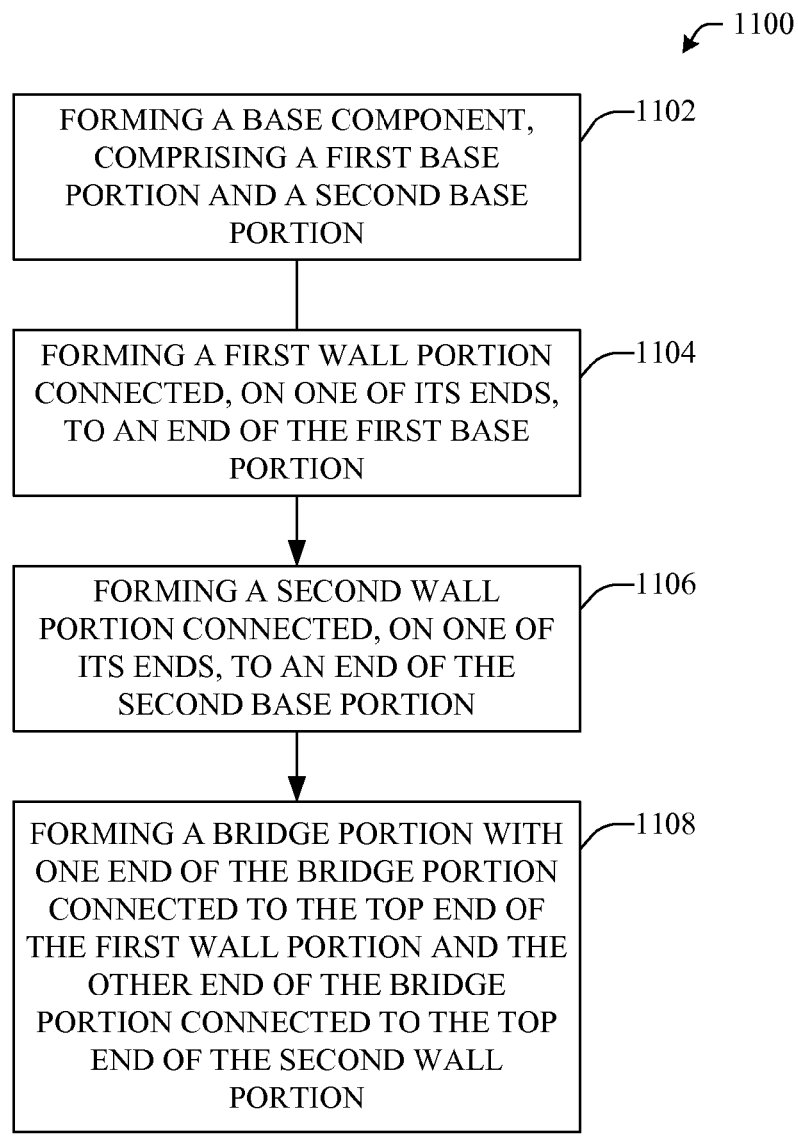
FIG. 11 illustrates a flow diagram of another example method for forming a wire bridge in accordance with various aspects and implementations of the disclosed subject matter.
Figure 12:
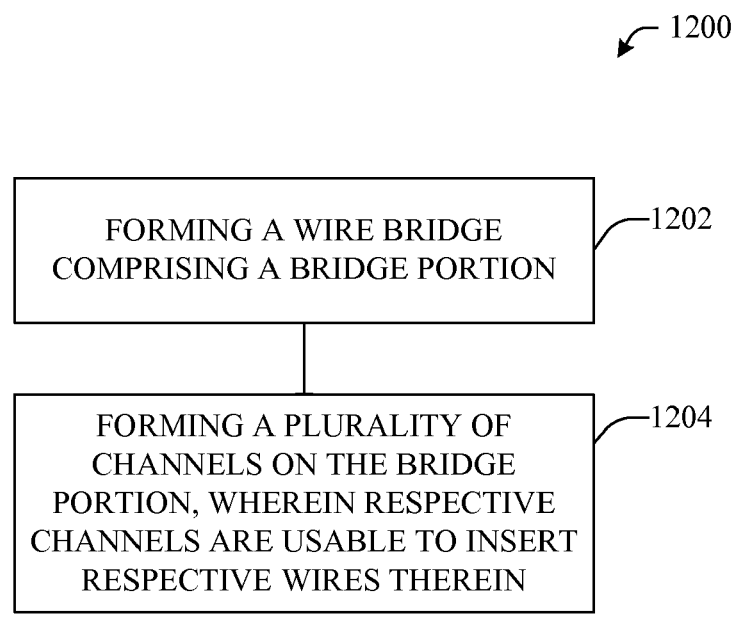
FIG. 12 presents a flow diagram of an example method for forming a plurality of channels on a wire bridge in accordance with aspects and implementations of the disclosed subject matter.

In view of the example systems described above, example methods that can be implemented in accordance with the disclosed subject matter can be better appreciated with reference to flowcharts in FIGS. 10-12. For purposes of simplicity of explanation, various methods disclosed herein are presented and described as a series of acts; however, it is to be understood and appreciated that the subject disclosure is not limited by the order of acts, as some acts may occur in different order and/or concurrently with other acts from that shown and described herein. It is noted that not all illustrated acts may be required to implement a described method in accordance with the subject specification. Further, an interaction diagram(s) can represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in this disclosure.

FIG. 10 is a flowchart of an example method 1000 for forming a wire bridge in accordance with various aspects and implementations of the disclosed subject matter. At 1002, a wire bridge can be formed at least partially of a thermally conductive material. At 1004, the wire bridge can be configured to contain a bridge component comprising a bridge portion that is raised to a specific height above a base component of the wire bridge. In an aspect, a subset of wires can be placed on the top surface of the bridge portion. The bridge portion can absorb heat from the subset of wires to facilitate controlling the heat level of the subset of wires.

FIG. 11 presents a flowchart of another example method 1100 for forming a wire bridge in accordance with various aspects and implementations of the disclosed subject matter. At 1102, a base component, comprising a first base portion and a second base portion, can be formed. At 1104, a first wall portion can be formed such that it is connected, on one of its ends, to an end of the first base portion. At 1106, a second wall portion can be connected, on one of its ends, to an end of the second base portion. The first wall portion and second wall portion can each have a specified height, wherein the height of the first wall portion can be the same or substantially the same as the height of the second wall portion.

At 1108, a bridge portion can be formed such that one end of the bridge portion is connected to the top end of the first wall portion and the other end of the bridge portion is connected to the top end of the second wall portion. The bridge portion can thereby be at a specified distance above the base component corresponding to the height of the first wall portion and second wall portion. The bridge portion, first wall portion, and second wall portion together can form the bridge component. A first subset of wires can be placed on the top surface of the bridge portion to facilitate dissipating heat from the first subset of wires. As desired, a second subset of wires can be routed through the open region defined and surrounded by the bridge component and the surface on which the wire bridge is placed or attached.

FIG. 12 is a flowchart of an example method 1200 for forming a plurality of channels on a wire bridge in accordance with aspects and implementations of the disclosed subject matter. At 1202, a wire bridge comprising a bridge portion can be formed. The wire bridge can be structured so that the bridge portion can be raised up to a specified height above a base component of the wire bridge.

At 1204, a plurality of channels can be formed on the bridge portion. In one implementation, the plurality of channels can be formed by structuring or shaping the bridge portion to have a series of alternating peaks and troughs and/or to have a series of channel walls with a channel well in between adjacent channel walls. The wire bridge, including the plurality of channels, can be formed using a desired fabrication process, such as a material-molding process or a punch-press process. In another implementation, the plurality of channels can be a separate component that is attached to the bridge portion. Respective wires of a subset of wires can be inserted into respective channels of the plurality of channels.

What has been described above includes examples of the disclosed subject matter. It is, of course, not possible to describe every conceivable combination of components and/or methods, but one of ordinary skill in the art may recognize that many further combinations and permutations are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A wire bridge, comprising:
    a base component including a first base portion and a second base portion situated at first and second sides of the wire bridge respectively, wherein the first base portion and the second base portion are configured to secure the wire bridge to a flat surface associated with an electrically powered system; and
    a bridge component including:
        a bridge portion having a channel component and a fin component;
        the channel component configured to be in contact with a first set of wires of the electrically powered system to facilitate dissipation of heat from the first set of wires, the channel component including a plurality of channels, wherein a first channel of the plurality of channels is configured to hold a first wire of the first set of wires, and each channel of the plurality of channels includes a well defined by adjacent channel walls of a predetermined channel height including a well bottom configured to be in contact with a respective wire of the first set of wires, wherein the adjacent channel walls extend upwards from the well bottom;

the fin component including one or more heat fins to facilitate the dissipation of heat generated by the first set of wires, wherein the one or more heat fins extend downwards from at least one of the well bottoms of the plurality of channels;

a first wall portion, an upper end of the first wall portion is connected to a first end of the bridge portion and a lower end of the first wall portion is connected to the first base portion of the base component; and a second wall portion, an upper end of the second wall portion is connected to a second end of the bridge portion, the second end opposite the first end, and a lower end of the second wall portion is connected to the second base portion of the base component, wherein the first wall portion and the second wall portion are substantially perpendicular to the bridge portion and the base component.

2. The wire bridge of claim 1, wherein at least the bridge portion of the wire bridge is formed of a thermally conductive material.

3. The wire bridge of claim 2, wherein the thermally conductive material is one of an aluminum alloy, aluminum, a copper alloy, copper, iron, an iron alloy, a gold alloy, gold, a silver alloy, or silver.

4. The wire bridge of claim 1, wherein the well bottom of the first channel is of a rounded semi-circle shape that corresponds to the first wire having a circular shape, wherein the first channel is configured to hold the first wire.

5. The wire bridge of claim 4, wherein the first channel is structured such that a width between the adjacent channel walls of the first channel substantially conforms to a diameter of the first wire, wherein the width between the adjacent channel walls of the first channel and the rounded semi-circle shape of the well bottom facilitate maximum contact between the first channel and the first wire.

6. The wire bridge of claim 1, wherein the predetermined channel height of the adjacent channel walls of the first channel is sufficient to enable the adjacent channel walls of the first channel to extend at least a certain length beyond the first wire when the first wire is inserted into the first channel to facilitate the dissipation of heat from the adjacent channel walls of the first channel into a surrounding air space.

7. The wire bridge of claim 1, wherein the plurality of channels are uniform in size and shape.

8. The wire bridge of claim 1, wherein the plurality of channels comprising the first channel of a first size and a first shape, and a second channel of a second size and a second shape.

9. The wire bridge of claim 1, wherein the one or more heat fins comprises two heat fins configured to enable routing of a wire of another set of wires underneath the bridge portion between the two heat fins.

10. The wire bridge of claim 1, wherein an open region is defined and surrounded at least in part by the bridge portion, the first wall portion and the second wall portion, and the open region is configured to route a second set of wires underneath the bridge portion and in between the first wall portion and the second wall portion.

11. The wire bridge of claim 10, wherein at least one wire of the first set of wires is a power wire configured to transfer power supplied from a power supply of the electrically powered system, wherein the power wire generates heat in response to the transfer of power; and at least one wire of the second set of wires is configured to transmit data.

12. A kit for assembling a wire bridge, comprising:
a first base portion configured to be secured to a first end of a first wall portion;
a second base portion configured to be secured to a first end of a second wall portion;
the first wall portion containing a second end configured to be secured to a first end of a bridge portion; and
the second wall portion containing a second end configured to be secured to a second end of the bridge portion, wherein, at least the bridge portion is made from a thermally conductive material;
the bridge portion is configured to route a set of wires for a power supply system;
the first and second base portions, the first and second wall portions and the bridge portion have a substantially rectangular shape;
the first and second base portions are configured to be connected to a flat surface;
the bridge portion having a channel component and a fin component;
the channel component configured to be in contact with the set of wires to facilitate dissipation of heat from the set of wires, the channel component including a plurality of channels, wherein a channel of the plurality of channels is configured to hold a respective wire of the set of wires, and each channel of the plurality of channels includes a well defined by adjacent channel walls of a predetermined channel height including a well bottom configured to be in contact with a wire of the set of wires, wherein the adjacent channel walls extend upwards from the well bottom; and
the fin component configured to include one or more heat fins to facilitate the dissipation of heat generated by the set of wires, wherein the one or more heat fins extend downwards from at least one of the well bottoms of the plurality of channels.

13. The kit for assembling a wire bridge of claim 12, wherein the first and second wall portions are configured to be snap fitted to the bridge portion and the first and second base portions.

14. The kit for assembling a wire bridge of claim 12, wherein the wire bridge is configured to be assembled such that the first wall portion and the second wall portion are substantially perpendicular to the bridge portion and the first and second base portions.

15. A method, comprising:
forming a bridge portion from a thermally conductive material;
coupling first and second wall portions to first and second base portions respectively;
coupling the bridge portion to the first and second wall portions at a predetermined distance away from the first and second base portions;
configuring the first and second wall portions to be substantially perpendicular to the bridge portion and the first and second base portions;
forming a plurality of channels on the bridge portion, wherein the forming the plurality of channels, comprising:

configuring the plurality of channels to be in contact with a set of wires associated with an electrically powered system to facilitate dissipation of heat generated by the set of wires, configuring a channel of the plurality of channels to hold a respective wire of the set of wires, and configuring each channel of the plurality of channels to include a well defined by adjacent channel walls of a predetermined channel height including a well bottom configured to be in contact with a wire of the set of wires, wherein each of the channel walls extends upwards from the well bottom; and forming one or more fins on the bridge portion that respectively extend downwards from at least one of the well bottoms of the plurality of channels, wherein the one or more fins facilitate the dissipation of heat generated by the set of wires.

16. The method of claim 15, further comprising:

the forming the one or more fins on the bridge portion comprising forming two fins on the bridge portion that respectively extend downwards from two well bottoms of two channels of the plurality of channels; and configuring the two fins to enable routing of a wire of another set of wires underneath the bridge portion between the two fins.

17. A power supply unit, comprising:

a wire bridge comprising:

a base component including a first base portion and a second base portion situated at first and second sides of the wire bridge, wherein the first base portion and the second base portion have a substantially polygonal shape, and the first and second base portions are connected to surfaces associated with the power supply unit to facilitate stability of the wire bridge; and a bridge component containing a bridge portion of a substantially polygonal shape, the bridge component including:

the bridge portion having a channel component and a fin component;

the channel component configured to be in contact with a set of wires of the power supply unit to facilitate dissipation of heat from the set of wires, the channel component including a plurality of channels, wherein a channel of the plurality of channels is configured to hold a respective wire of the set of wires, and each channel of the plurality of channels includes a well defined by adjacent channel walls of a predetermined channel height including a well bottom configured to be in contact with a wire of the set of wires, wherein the adjacent channel walls extend upwards from the well bottom;

the fin component configured to include one or more heat fins to facilitate the dissipation of heat generated by the set of wires, wherein the one or more heat fins extend downwards from at least one of the well bottoms of the plurality of channels; and first and second wall portions have a substantially polygonal shape, wherein a first end of the bridge portion is connected to a top end of the first wall portion and a second end of the bridge portion is connected to a top end of the second wall portion, wherein the first wall portion and the second wall portion are substantially perpendicular to the bridge portion and the base component, wherein at least a top surface of the bridge portion routes the set of wires placed in contact with the top surface of the bridge portion to facilitate dissipation of heat from the set of wires, and wherein at least the bridge portion is formed of a thermally conductive material.

18. The power supply unit of claim 17, wherein the set of wires comprises power wires configured to be connectable to a power supply of the power supply unit, and wherein the power wires generate heat in response to transfer of power obtained from the power supply.

* * * * *